United States Patent [19]

Daniel et al.

[11] 3,752,501

[45] Aug. 14, 1973

[54] STEERING WHEEL INFLATABLE CUSHION DEVICE

[75] Inventors: Roger P. Daniel, Dearborn; Alex Rhodes, Detroit, both of Mich.

[73] Assignee: Ford Motor Company, Dearborn, Mich.

[22] Filed: Oct. 20, 1971

[21] Appl. No.: 190,846

[52] U.S. Cl. .......................... 280/150 AB, 280/87 R
[51] Int. Cl. ............................................. B60r 21/10
[58] Field of Search ................... 280/150 AB, 150 B, 280/87 R

[56] References Cited
UNITED STATES PATENTS

| 3,580,603 | 5/1971 | Chute | 280/150 AB |
| 3,476,402 | 11/1969 | Wilfert | 280/150 AB |
| 2,974,912 | 3/1961 | Namsick | 244/138 R |
| 3,642,303 | 2/1972 | McLean | 280/150 AB |

Primary Examiner—Kenneth H. Betts
Assistant Examiner—John A. Carroll
Attorney—Keuth L. Zerschling and John J. Roethel

[57] ABSTRACT

An inflatable cushion device for protective interposition between a vehicle operator and the rim and hub of a vehicle steering wheel assembly. The cushion is compartmented to provide, when inflated, peripheral ring compartmentation in juxtaposition to the steering wheel rim and center compartmentation in overlying juxtaposition to the steering wheel hub. The peripheral ring compartmentation when pressurized provides greater resistance to collapse than the center compartmentation, whereby the peripheral ring compartmentation is adapted to guide the vehicle operator upon contact of the latter with the cushion toward the center compartmentation thereby to maintain the vehicle operator in substantially centered cushioned relationship to the steering wheel assembly under vehicle impact conditions.

14 Claims, 2 Drawing Figures

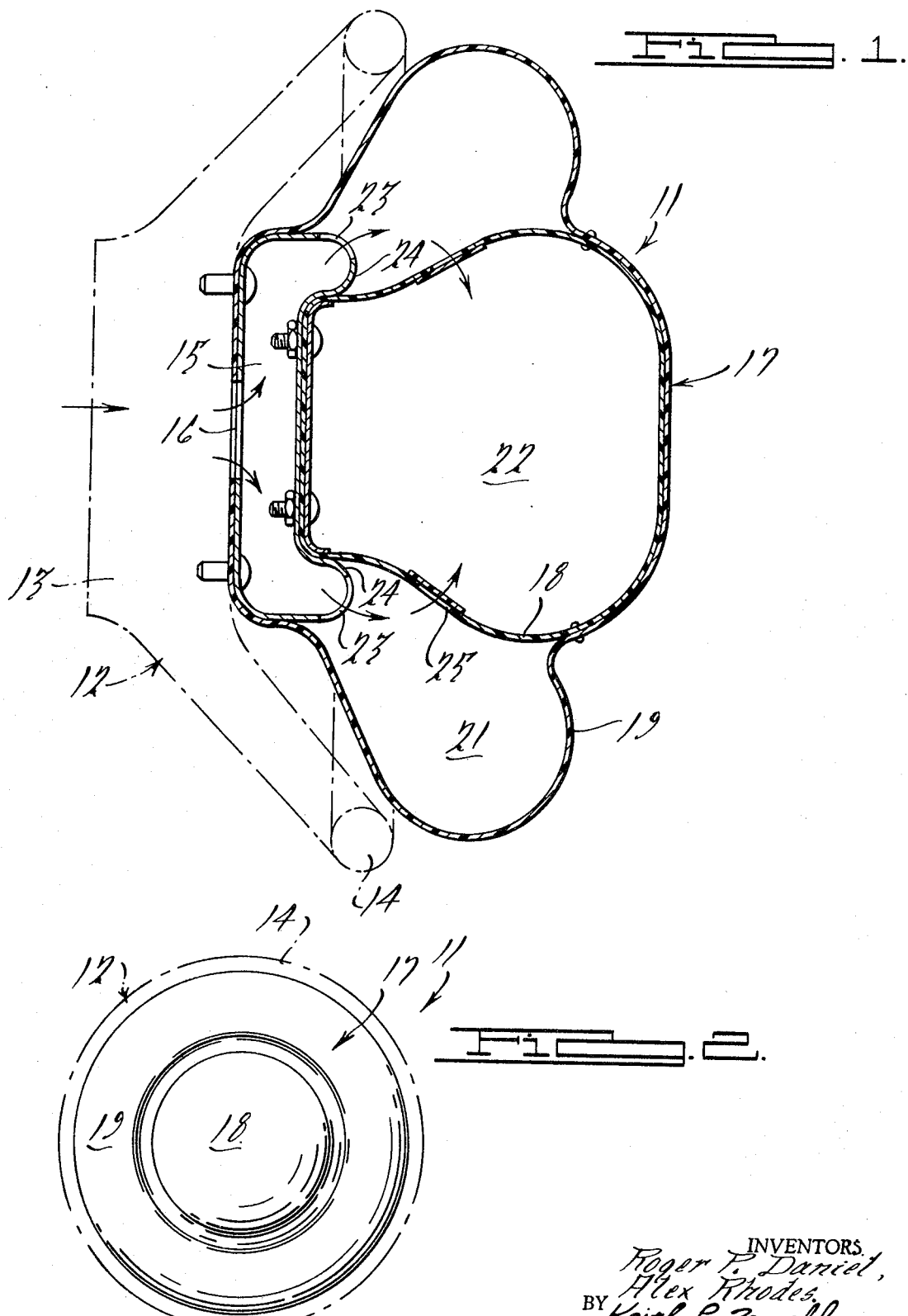

STEERING WHEEL INFLATABLE CUSHION DEVICE

BACKGROUND OF THE INVENTION

Air bags or inflatable cushion devices currently under development for use as protective devices between a vehicle operator and the vehicle steering wheel assembly generally are inflatable from the steering wheel hub and form esentially a large ball of contained low pressure air, backed up by the steering wheel hub and rim. Such air bags effectively restrain the impact of an occupant moving directly forward into the center of the bag, but the occupant tends to slide off the bag during off-center impacts. Such a bag system is disclosed in U.S. Pat. No. 3,580,603 entitled "Inflatable Safety Apparatus" issued May 25, 1971 to Richard Chute.

It is an object of the present invention to provide an air bag or inflatable cushion device which is stiffer at its periphery than at its center, thus tending to direct the vehicle occupant or operator toward the center of the bag upon impact. This air bag contains two compartments; an outer, donut-shaped ring or torus, and an inner compartment of somewhat larger volume. During occupant impact, the high pressure periphery of the air bag helps prevent the occupant from being thrown laterally off the bag. Instead he is directed toward the lower pressure central area of the bag, at which place the bag is best supported by the steering wheel and is able to absorb energy in the most effective manner.

SUMMARY OF THE INVENTION

The present invention embodies an inflatable cushion device for protective interposition between a vehicle operator and the rim and hub of a vehicle steering wheel assembly under vehicle collision conditions. The inflatable cushion device comprises a gas diffuser or manifold mounted on the hub and adapted to be connected to a pressurized gas source. Mounted on the diffuser is an inflatable cushion which when in collapsed condition is housed within the confines of the steering wheel rim. The cushion is compartmented to provide, when inflated, peripheral ring compartmentation in juxtaposition to the steering wheel rim and center compartmentation in overlying juxtaposition to the steering wheel hub. The peripheral ring compartmentation upon being pressurized by gas received from the diffuser is adapted to provide greater resistance to collapse than the center compartmentation whereby the peripheral ring compartmentation guides the vehicle operator upon his contact with the cushion toward the center compartmentation thereby to maintain the vehicle operator in substantially centered cushioned relationship to the steering wheel assembly during vehicle collision conditions.

BRIEF DESCRIPTION OF THE DRAWINGS

Other objects, advantages and features of the present invention will be more apparent as this description proceeds, reference being had to the accompanying drawing, wherein:

FIG. 1 is a vertical sectional view through an inflatable cushion device embodying the present invention; and FIG. 2 is a reduced plan view of the inflated cushion device shown in FIG. 1.

DETAILED DESCRIPTION OF THE INVENTION

As embodied in the present invention, the inflatable cushion device or apparatus, generally designated 11, is mounted for protective interposition between a vehicle operator and a vehicle steering wheel assembly, generally designated 12.

The steering wheel assembly 12 is conventional in that it has a hub 13 and rim 14. Mounted on the hub 13 is a diffuser or manifold 15 which is adapted to be connected to an inflatable medium source, not shown. The inflatable medium is generally a gas which may either be released from a high pressure container or pyrotechnically generated. For the purpose of understanding the present invention, it is believed sufficient to indicate that under vehicle collision conditions, a high pressure gas is available at the base orifice 16 leading to the diffuser or manifold 15.

The diffuser or manifold 15 is annular-shaped and forms a platform for the inflatable cushion or air bag, generally designated 17. The air bag or cushion 17 in its collapsed or deflated condition is housed within the confines of the steering wheel assembly 12.

In its illustrated form, the air bag or cushion 17 appears as an inner bag 18 and an outer bag 19. It should be understood, however, that the exact construction of the bag is not important as long as when inflated it presents a dual compartmented envelope. The dual compartmented envelope must have, in accordance with the present invention, a peripheral ring compartment 21 and a center compartment 22.

The peripheral ring compartmentation 21 is substantially toroidal in shape. THe center compartmentation 22 is of greater volumetric capacity than the peripheral ring compartmentation 21 and when inflated projects upwardly above the steering wheel rim 14 to a greater degree than the peripheral ring compartmentation.

The peripheral ring compartmentation 21 is in direct communication with the diffuser or manifold 15 through suitable orifices 23 in the wall 24 of the latter. The center compartmentation 22 is solely in direct communication with the peripheral ring compartmentation 21. That is, it receives its inflating gas in sequence from the diffuser or manifold 15 through the peripheral ring compartmentation 21. The compartmentation 22 is not in direct communication with the diffuser or manifold 15. The communication between the compartments 21 and 22 comprises a series of orifices 25 located in the portion of the wall of the inner bag 18 which is common to both compartments.

When the high pressure inflation medium source has been triggered upon the vehicle becoming involved in a collision, gas under pressure enters the manifold 15 and is distributed to the peripheral ring compartmentation 21 of the air bag or cushion device thereby causing the outer peripheral ring to be inflated to a comparatively high pressure. The gas then leaks from this high pressure area into the low pressure central area or compartmentation 22 through the orifices 25. Because of the frictional loss in the flow of the inflation medium through the orifice 25 and also because of the fact that the center compartmentation is of substantially greater volume than the peripheral ring compartmentation 21, the ultimate pressure achieved in the center compartmentation 22 is not as great as that in the peripheral ring compartmentation 21. Thus, as the vehicle operator is thrown towards the steering column, the high pressure peripheral ring of the air bag helps prevent the operator from being thrown laterally off the bag. Instead, he is directed toward the lower pressure central area of the bag, at which place the bag is best supported by the steering wheel assembly 12 and is best able to absorb energy in the most effective manner. If desired, a variable-flow orifice (not shown) may be placed in the wall of the center compartmentation to exhaust to atmosphere therefore permitting the bag to deflate after having served its function as a cushion interposed between the vehicle operator and the steering assembly.

It will be understood that the invention is not to be limited to the exact construction shown and described but that various changes and modifications may be made without departing from the spirit and scope of the invention as defined in the appended claims.

We claim:

1. An inflatable cushion device for protective interposition between a vehicle operator and the rim and hub of a vehicle steering wheel assembly under vehicle collision conditions, comprising:
    a gas diffuser mounted on the hub and adapted to be connected to a pressurized gas source,
    and an inflatable cushion mounted on the diffuser and when in collapsed condition being housed within the confines of the steering wheel rim,
    the cushion being compartmented to provide, when inflated, peripheral ring compartmentation in juxtaposition to the steering wheel rim and center compartmentation in overlying juxtaposition to the steering wheel hub,
    the peripheral ring compartmentation being substantially toroidal in shape,
    the center compartmentation, when inflated, projecting upwardly above the steering wheel rim to a greater degree than the peripheral ring compartmentation,
    the center compartmentation being of greater volume than the peripheral ring compartmentation,
    the peripheral ring compartmentation being in direct communication with the diffuser and inflated by gas discharged therefrom,
    and the center compartmentation being solely in direct communication with the peripheral ring compartmentation and inflated by gas received from the latter through orifices in a common wall therebetween,
    the peripheral ring compartmentation being pressurized by the gas received from the diffuser to provide greater resistance to collapse than the center compartmentation whereby the peripheral ring compartmentation is adapted to guide the vehicle operator upon contact with the cushion toward the center compartmentation thereby to maintain the vehicle operator in substantially centered cushioned relationship to the steering wheel assembly.

2. An inflatable cushion device for protective interposition between a vehicle operator and the rim and hub of a vehicle steering wheel assembly under vehicle collision conditions, comprising:
    a gas diffuser mounted on the hub and adapted to be connected to a pressurized gas source,
    and an inflatable cushion mounted on the diffuser and when in collapsed condition being housed within the confines of the steering wheel rim,
    the cushion being compartmented to provide, when inflated, peripheral ring compartmentation in juxtaposition to the steering wheel rim and center compartmentation in overlying juxtaposition to the steering wheel hub,
    the center compartmentation, when inflated, projecting upwardly above the steering wheel rim to a greater degree than the peripheral ring compartmentation,
    the peripheral ring compartmentation being pressurized by gas received from the diffuser to provide greater resistance to collapse than the center compartmentation whereby the peripheral ring compartmentation is adapted to guide the vehicle operator upon contact with the cushion toward the center compartmentation thereby to maintain the vehicle operator in substantially centered cushioned relationship to the steering wheel assembly.

3. An inflatable cushion device according to claim 2, in which:
    the center compartmentation is of greater volume than the peripheral ring compartmentation.

4. An inflatable cushion device, according to claim 3, in which:
    the peripheral ring compartmentation is in direct communication with the diffuser and is inflated by gas discharged from the latter,
    and the center compartmentation is solely in direct communication with the peripheral ring compartmentation and is inflated by gas received from the latter through orifices in a common wall therebetween.

5. An inflatable cushion device for protective interposition between a vehicle operator and the rim and hub of a vehicle steering wheel assembly under vehicle collision conditions, comprising:
    a gas diffuser mounted on the hub and adapted to be connected to a pressurized gas source,
    and an inflatable cushion mounted on the diffuser and when in collapsed condition being housed within the confines of the steering wheel rim,
    the cushion being compartmented to provide, when inflated, peripheral ring compartmentation in juxtaposition to the steering wheel rim and center compartmentation in overlying juxtaposition to the steering wheel hub,
    the center compartmentation being of greater volume than the peripheral ring compartmentation,
    the peripheral ring compartmentation being pressurized by gas received from the diffuser to provide greater resistance to collapse than the center compartmentation whereby the peripheral ring compartmentation is adapted to guide the vehicle operator upon contact with the cushion toward the center compartmentation thereby to maintain the vehicle operator in substantially centered cushioned relationship to the steering wheel assembly.

6. An inflatable cushion device according to claim 5, in which:
    the peripheral ring compartmentation is in direct communication with the diffuser and is inflated by gas discharged therefrom,
    and the center compartmentation is in direct communication with the peripheral ring compartmentation and is inflated by gas received from the latter through orifices in a common wall therebetween.

7. An inflatable cushion device for protective interposition between a vehicle operator and the rim and hub of a vehicle steering wheel assembly under vehicle collison conditions, comprising:

a gas diffuser mounted on the hub and adapted to be connected to a pressurized gas source, and an inflatable cushion mounted on the diffuser and when in collapsed condition being housed within the confines of the steering wheel rim, the cushion being compartmented to provide, when inflated, peripheral ring compartmentation in juxtaposition to the steering wheel rim and center compartmentation in overlying juxtaposition to the steering wheel hub, the peripheral ring compartmentation being in direct communication with the diffuser and inflated by gas discharged therefrom, and the center compartmentation being in direct communication with the peripheral ring compartmentation and inflated by gas discharged through orifices in a common wall therebetween, the peripheral ring compartmentation being pressurized by gas received from the diffuser to provide greater resistance to collapse than the center compartmentation whereby the peripheral ring compartmentation is adapted to guide the vehicle operator upon contact with the cushion toward the center compartmentation thereby to maintain the vehicle operator in substantially centered cushioned relationship to the steering wheel assembly.

8. An inflatable cushion device for protective interposition between a vehicle operator and the hub of a vehicle steering wheel assembly, comprising:

a gas distribution manifold mounted on the hub and adapted to be connected to a source of gas for inflation of the cushion under vehicle collision conditions, and an inflatable cushion mounted on the manifold, the cushion having a peripheral compartment of a predetermined volume and a separate center compartment of larger volume, the peripheral compartment being in direct communication with the manifold, and the center compartment being in direct communication with the peripheral compartment through orifices in a wall therebetween, the air from the high pressure source being utilized to first inflate the peripheral compartment to a comparatively high pressure and then the larger volume center compartment to a pressure lower than that of the peripheral compartment, the high pressure peripheral compartment of the than being effective to guide the operator upon impact therewith toward the lower pressure center of the bag to maintain the operator in substantially centered cushioned relationship to the steering wheel.

9. An inflatable cushion device according to claim 8, in which:

the center compartment when inflated projects upwardly toward the vehicle operator to a greater degree than the peripheral ring compartment.

10. An inflatable cushion device according to claim 9, in which:

the peripheral compartment is of substantially toroidal shape.

11. An inflatable cushion apparatus adapted under vehicle collision conditions to be protectably interposed between a vehicle operator and the vehicle steering wheel assembly, the steering wheel assembly having at least a rim and a hub means supporting the rim, the cushion apparatus comprising:

inflation medium distribution means mounted on the hub means and adapted to be connected to an inflation medium source, and an inflatable cushion coupled to the inflation medium distribution means and when in deflated condition being housed within the confines of the steering wheel assembly, the cushion having a peripheral ring compartment surrounding a central compartment, the peripheral and central compartments having a common wall therebetween and being in communication with each other through orifices in the common wall, the cushion when inflated having its peripheral ring compartment substantially overlying the steering wheel rim and its center compartment in overlying juxtaposition to the steering wheel hub, the sequence of inflation of the cushion being first the peripheral ring compartment and then the center compartment, the peripheral ring compartment achieving higher pressurization than the center compartment whereby the peripheral ring compartment is adapted to guide the vehicle operator upon contact with the cushion toward the center compartment thereby to maintain the operator in substantially centered cushion relationship to the steering wheel assembly.

12. An inflatable cushion apparatus according to claim 11, in which:

the peripheral ring compartment is substantially toroidal in shape.

13. An inflatable cushion apparatus according to claim 12, in which:

the center compartment, when inflated, projects upwardly above the steering wheel rim to a greater degree than the peripheral ring compartment.

14. An inflatable cushion apparatus according to claim 13, in which:

the center compartment is of greater volume then the peripheral ring compartment.

* * * * *